US010669943B2

United States Patent
Weir et al.

(10) Patent No.: US 10,669,943 B2
(45) Date of Patent: Jun. 2, 2020

(54) FUEL PUMPING ARRANGEMENT FOR AN AIRCRAFT ENGINE

(71) Applicant: ROLLS-ROYCE PLC, London (GB)

(72) Inventors: Christopher John William Weir, Solihull (GB); Daniel James Bickley, Solihull (GB)

(73) Assignee: ROLLS-ROYCE plc, London (GB)

( * ) Notice: Subject to any disclaimer, the term of this patent is extended or adjusted under 35 U.S.C. 154(b) by 577 days.

(21) Appl. No.: 15/445,123

(22) Filed: Feb. 28, 2017

(65) Prior Publication Data

US 2017/0167387 A1    Jun. 15, 2017

Related U.S. Application Data

(62) Division of application No. 13/372,950, filed on Feb. 14, 2012, now abandoned.

(30) Foreign Application Priority Data

Feb. 17, 2011    (GB) .................................. 1102772.9

(51) Int. Cl.
| | | |
|---|---|---|
| F02C 7/22 | (2006.01) | |
| F02C 7/236 | (2006.01) | |
| F02C 9/26 | (2006.01) | |
| F02C 7/232 | (2006.01) | |

(52) U.S. Cl.
CPC ............... *F02C 7/236* (2013.01); *F02C 7/22* (2013.01); *F02C 7/232* (2013.01); *F02C 9/26* (2013.01); *F05D 2220/323* (2013.01); *F05D 2270/05* (2013.01); *Y02T 50/671* (2013.01)

(58) Field of Classification Search
CPC .... F02C 7/22; F02C 7/236; F02C 9/19; F02C 9/26; F02C 9/44; F02C 9/52
See application file for complete search history.

(56) References Cited

U.S. PATENT DOCUMENTS

| | | |
|---|---|---|
| 2,916,875 A | 12/1959 | Morley et al. |
| 3,056,259 A | 10/1962 | Jubb et al. |
| 3,147,712 A | 9/1964 | Gaubatz |
| 4,339,917 A * | 7/1982 | LaGrone ................ F02C 7/236 137/565.32 |
| 4,697,238 A | 9/1987 | Barbeau |

(Continued)

FOREIGN PATENT DOCUMENTS

| | | |
|---|---|---|
| EP | 0145636 A1 | 6/1985 |
| EP | 1335121 A2 | 8/2003 |

(Continued)

OTHER PUBLICATIONS

Jan. 15, 2016 Office Action issued in U.S. Appl. No. 14/372,950.

(Continued)

*Primary Examiner* — Arun Goyal
(74) *Attorney, Agent, or Firm* — Oliff PLC

(57) ABSTRACT

An aircraft fuel pumping arrangement comprises a first fuel pump, an electrically powered motor operable to drive the first fuel pump to deliver fuel to an outlet, a second fuel pump, a gas driven turbine operable to drive the second fuel pump to deliver fuel to the outlet, and a controller operable to control the operation of the gas driven turbine to determine the rate at which the second fuel pump is driven.

9 Claims, 1 Drawing Sheet

(56) References Cited

U.S. PATENT DOCUMENTS

Figure 1:
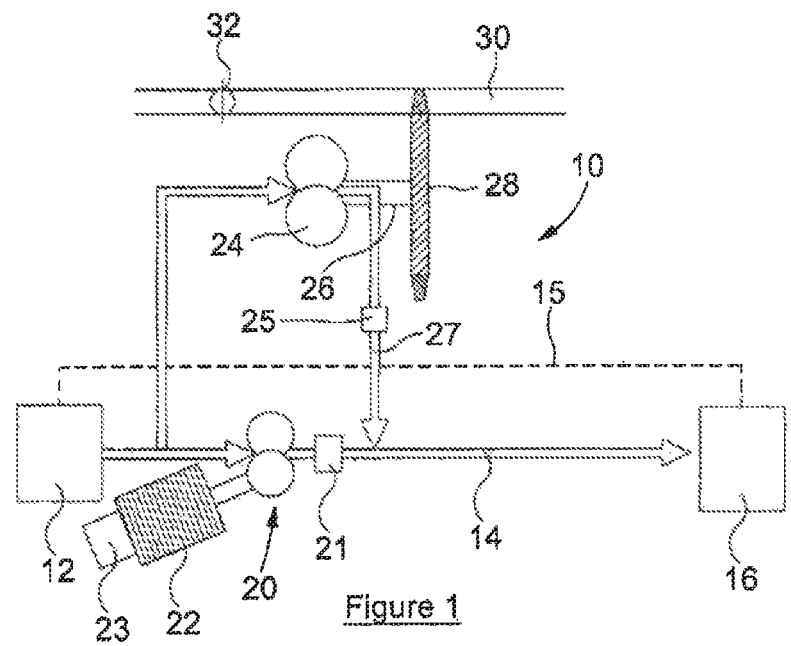

| | | | |
|---|---|---|---|
| 4,864,815 | A | 9/1989 | Cygnor |
| 5,118,258 | A | 6/1992 | Martin |
| 6,971,373 | B2 | 12/2005 | Mudway et al. |
| 7,497,083 | B2 | 3/2009 | Yates et al. |
| 8,302,406 | B2 | 11/2012 | Baker |
| 8,418,964 | B2 | 4/2013 | LeBlanc et al. |
| 8,881,529 | B2 | 11/2014 | Wittmann |
| 2004/0011018 | A1 | 1/2004 | Bouiller et al. |
| 2005/0241318 | A1 | 11/2005 | Buehman et al. |
| 2010/0126136 | A1 | 5/2010 | Anson |

FOREIGN PATENT DOCUMENTS

| | | | |
|---|---|---|---|
| GB | 743859 | A | 1/1956 |
| GB | 852221 | A | 10/1960 |
| GB | 876186 | A | 8/1961 |
| GB | 1598555 | A | 9/1981 |
| GB | 2451575 | A | 2/2009 |

OTHER PUBLICATIONS

Apr. 28, 2016 Office Action issued in U.S. Appl. No. 13/372,950.
Aug. 25, 2016 Office Action issued in U.S. Appl. No. 13/372,950.
Jul. 9, 2015 Office Action issued in U.S. Appl. No. 131372,950.
Feb. 4, 2015 Office Action issued in U.S. Appl. No. 131372,950.
Jun. 3, 2011 British Search Report issued in GB Application No. 1102772.9.

\* cited by examiner

FUEL PUMPING ARRANGEMENT FOR AN AIRCRAFT ENGINE

This application is a Divisional Application of U.S. patent application Ser. No. 13/372,950, which was filed Feb. 14, 2012, and claims priority to GB 1102772.9, which was filed Feb. 17, 2011. The disclosures of the prior applications are hereby incorporated by reference in their entirety.

This invention relates to an aircraft fuel pumping arrangement for use in supplying fuel to a gas turbine engine.

A gas turbine engine used in the aerospace industry is typically arranged to be supplied with fuel, in use, by a high pressure fuel pump, a suitable metering arrangement being provided to control the rate at which fuel from the fuel pump is supplied to the engine. Although a wide range of fuel pump designs are known, commonly the fuel pumps are driven from the accessory gearbox associated with the engine and so the pump is driven at a speed related to the operating speed of the engine.

The fuel pump must be designed in such a manner as to ensure that fuel is able to be delivered at a sufficiently high rate to meet the maximum fuel demand or fuelling requirement of the engine, such as that experienced during take-off or climb operating conditions. It will be appreciated that the fuelling requirement of the engine varies considerably in use and so, for most of the time, the actual fuelling requirement of the engine is considerably lower than the aforementioned maximum fuelling requirement.

There is a move towards using relatively small, low weight electrically powered motors to drive various components or systems of an aircraft rather than using the accessory gearbox associated with an engine to operate such components or systems and a point may be reached at which such a gearbox may be omitted, leading to cost and weight savings. The provision of an electrically powered motor, and associated control and power circuitry, of a sufficient size to allow it to drive a pump so as to be able to meet the maximum fuelling requirement of the engine is undesirable as such a motor and associated power electronics is of relatively high weight. Furthermore, other challenges are faced in providing a motor suitable for use in such an application. For example, the electro-magnetic and thermal design of such a high power motor is complicated, and mitigation of problems associated with the control and thermal management of the generated electrical power is difficult.

It is an object of the invention to provide a pumping arrangement suitable for use in such applications and in which the pumping arrangement is not driven from an engine accessory gearbox.

Electrically driven pump arrangements are well known. For example, U.S. Pat. No. 6,971,373 describes a complex arrangement of electric motor driven pumps that meets the maximum fuel demand of a gas turbine engine, whilst ensuring that the safety requirements of such a critical system are achieved. Such an arrangement is relatively large and heavy, and requires relatively complex and large control circuitry and power electronics.

It is known to use a flow of air bled from the compressor of the engine to drive a turbine, the turbine being coupled to a pump such that the flow of air ultimately powers the operation of the pump. One such arrangement is disclosed in US2004/0011018 in which an air driven turbine is used to provide a back-up drive to an aircraft engine fuel pump in the event that its main source of power, an electric motor, fails.

According to the present invention there is provided an aircraft fuel pumping arrangement comprising a first fuel pump, an electrically powered motor operable to drive the first fuel pump to deliver fuel to an outlet, a second fuel pump, a gas driven turbine operable to drive the second fuel pump to deliver fuel to the outlet, and a controller operable to control the operation of the gas driven turbine to determine the rate at which the second fuel pump is driven, wherein the first and second fuel pumps are arranged to be used in combination during high engine load conditions to meet the fuel delivery and system pressure level requirements of the engine, the output of the electrically powered motor driven first fuel pump, alone, normally being used to achieve the required fuel delivery and system pressure level in lower engine load conditions.

It will be appreciated that, in such an arrangement, the electrically powered motor can be relatively small as it does not need to be able to provide sufficient drive to the first fuel pump such that the fuel delivery from this pump meets the maximum fuel delivery rate and system pressure level required by the engine. Rather, the maximum fuel delivery rate and system pressure requirement is met by the operation of the electrically powered motor driven first fuel pump in conjunction with the operation of the second fuel pump that is driven by the gas driven turbine. The space and weight savings that can be made with such a fuel pumping arrangement are thus significant.

The controller conveniently comprises a gas valve operable to control the supply of gas to the turbine and thereby control whether or not the gas driven turbine and second fuel pump are active at any given time. This gas valve could take the form of a simple on/off device or, alternatively, may be a modulating type device that provides progressive control of the second fuel pump.

The first and second fuel pumps may be arranged in parallel with one another. The second pump may then only operate when required to supplement the output of the first fuel pump when the fuel delivery and system pressure requirement is relatively high. In such an arrangement, the second fuel pump conveniently comprises a positive displacement pump such as a gear pump. However, other types of pump may be used as described herein.

Alternatively, the first and second pumps may be arranged in series. For example, the second pump may be located downstream of the first pump and arranged, during high engine load conditions, to raise the pressure from which fuel is delivered from the first pump to the required system pressure level and thereby assist the electrically powered motor driven first fuel pump in achieving the demanded fuel delivery rate and system pressure. In this arrangement it will be appreciated that the first and second fuel pumps must both be of relatively large form, sufficiently large to allow the maximum fuel flow to be delivered by each of the pumps. In such an arrangement, the first fuel pump conveniently comprises a positive displacement pump and second fuel pump conveniently comprises a roto-dynamic pump such as a centrifugal pump so as to allow the delivery of fuel from the first fuel pump in a relatively unimpeded manner when the turbine and second fuel pump are inactive.

Either arrangement may include a dedicated fuel valve that e.g. provides 'get home' or 'limp home' functionality. Where the pumps are arranged in parallel then the dedicated fuel valve is preferably located adjacent the first pump, for example adjacent an outlet thereof. The dedicated fuel valve may then take the form of a non-return valve e.g. located adjacent the first fuel pump and operable to prevent fuel delivered from the second fuel pump from returning through the first fuel pump to a low pressure side thereof. Where the pumps are arranged in series, then the dedicated fuel valve may take the form of, for example, either a non-return valve or a by-pass valve is conveniently provided in a by-pass passage around the first pump.

Figure 2:
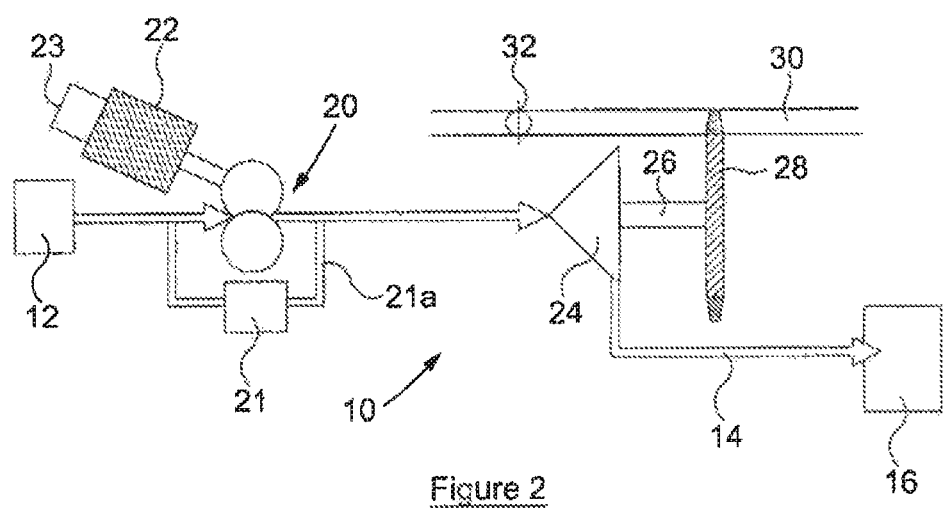

The invention will further be described, by way of example, with reference to the accompanying drawings, in which:

FIG. 1 illustrates a fuel system incorporating a fuel pumping arrangement in accordance with one embodiment of the invention; and FIG. 2 is a view similar to FIG. 1 but illustrating an alternative form of fuel pumping arrangement.

Referring firstly to FIG. 1 there is illustrated a fuel system comprising a fuel pumping arrangement 10 whereby fuel is delivered from a low pressure fuel supply line 12 to a high pressure supply line 14, which in turn feeds a fuel metering unit 16. The pumping arrangement 10 is operable to raise the fuel pressure to a desired outlet pressure and to ensure that fuel is delivered to the high pressure supply line 14 at a rate sufficient to meet the fuel delivery rate and system pressure requirements of an associated engine (not shown) at any operating condition.

The fuel metering unit 16 serves to control the rate at which fuel is supplied to the engine. A number of designs of fuel metering unit are known and the form and function thereof will not be described herein in further detail.

The pumping arrangement 10, in this embodiment, comprises a first, relatively small positive displacement fuel pump 20, for example in the form of a gear pump, arranged to be driven by an electrically powered motor 22, which in turn is control by associated power electronics 23 that are either integrated into the design of the motor 22 (as illustrated) necessitating the use of high-temperature electronics, or are mounted remotely from the motor 22 in a lower temperature region of the engine. This control enables modulated fuel flow delivery from the pump 20. The first fuel pump 20 is of insufficient capacity to meet, alone, the maximum fuel delivery requirement of the associated engine. Likewise, the electrically powered motor 22 is of relatively small size, being designed to ensure that the first fuel pump 20 can be driven at its optimum operating duty, this duty being lower than that required to meet the maximum fuel delivery requirement of the associated engine.

Mounted in parallel with the first pump 20 is provided a second fuel pump 24. Like the first fuel pump 20, the second fuel pump 24, in this embodiment, is of the positive displacement type, for example comprising a gear pump. The second fuel pump 24 is of greater capacity than the first fuel pump 20 but, alone, is unable to meet the maximum fuel delivery requirement of the associated engine. It should be noted that although neither of the pumps 20, 24 is designed to meet the maximum fuel delivery on its own, they are designed to operate in conjunction with the fuel metering unit 16 and develop the required system pressure level on their own.

The second fuel pump 24 is not arranged to be driven from the output of an electrically powered motor. Rather, it is connected to an output shaft 26 connected to a gas driven turbine 28. The turbine 28 includes blades exposed to a flow of air along a by-pass or bleed line 30 whereby air is bled from the compressor stage of the associated engine. A gas valve 32, such as a butterfly valve, or other gas flow control means, such as a modulating device, is provided in the line 30 to control the flow of air along the line 30, and thus control whether or not the turbine 28 is driven for rotation and so also control whether or not the fuel pump 24 is driven to deliver fuel to the high pressure supply line 14. If the gas valve 32 were to take the form of a modulating type device, progressive control of the delivery of fuel from the second pump 24 could be provided.

In use, under most engine operating conditions, for example under cruise conditions, the first fuel pump 20 and electrically powered motor 22 are capable of delivering fuel to the high pressure supply line 14 and fuel metering unit 16 at a sufficiently high rate and pressure to meet the fuel delivery rate and system pressure requirements of the engine. When operating under these conditions, the gas valve 32 is closed, restricting or preventing air flow along the line 30 and so the turbine 28 and second fuel pump 24 are not active. The fuel delivery requirements are thus met by the operation of the first fuel pump 20 and electrically powered motor 22 alone.

When the engine is operating under higher fuel delivery rate requirement conditions, such as during take-off or climb then the gas valve 32 is opened to allow air to flow along the line 30. The air flow rate along the line 30 is high as a result of the line 30 being connected to the compressor of the engine, thus the flow of air is able to drive the turbine 28 for rotation. The rotation of the turbine is transmitted by the output shaft 26 to the second fuel pump 24, driving the second fuel pump 24 so as to result in fuel being delivered to the high pressure supply line 14 and fuel metering unit 16 from the second fuel pump 24, supplementing the delivery of fuel from the first fuel pump 20. During this mode of operation, the first fuel pump 20 will continue to operate, being driven by the electrically powered motor 22, and thus the engine fuel delivery rate requirement is met by the operation of the first and second pumps 20, 24, in combination.

As mentioned hereinbefore, the gas valve 32 could take the form of a modulating device such that progressive control of the airflow along the line 30 can be provided, resulting in progressive control of the turbine 28, second fuel pump 24 and delivery of fuel to the high pressure supply line 14 from the second fuel pump 24.

A dedicated fuel valve 21, in this embodiment taking the form of a non-return valve, is conveniently located adjacent the outlet of the first fuel pump 20 so that in the event of, for example, an electrical or control failure resulting in the first fuel pump 20 no longer being driven or a failure within the pump 20, operation of the second fuel pump 24 alone can be used to supply sufficient fuel to the fuel metering unit 16 to allow continued operation of the systems downstream thereof, the dedicated fuel valve 21 serving to prevent the fuel delivered by the second fuel pump 24 flowing back through the first fuel pump 20, driving the first fuel pump 20 in the reverse direction, to the low pressure side thereof. It will be appreciated that in this manner, 'get home' or 'limp home' functionality can be provided to allow limited operation of the fuel system sufficient for safe flight and landing in the event that the electric motor drive and/or pump fails, the fuel requirement being met by the second pump 24 alone in these circumstances.

Whilst the arrangement described hereinbefore includes a fuel metering unit 16 controlling the supply of fuel from the supply line 14 to the associated engine, where the fuel pumps 20, 24 can be controlled sufficiently accurately with modulated control of their respective drives, as mentioned hereinbefore, to permit sufficiently accurate control over the fuel supply, it may be possible to omit the fuel metering unit 16 or to reduce the complexity thereof. Where a fuel metering unit 16 is provided, as illustrated, then the pumping arrangement 10 will normally be operated to supply fuel to the fuel metering unit 16 at a level greater than the fuel delivery requirement of the engine at any given operating condition, the fuel metering unit 16 functioning to spill a proportion of the delivered fuel from the high pressure supply line 14 back to the low pressure supply line 12 via a spill line 15, and thus delivering the demanded quantity of fuel to the engine.

Although not shown, a low pressure pump, in the form of, for example, a centrifugal pump, may be provided upstream of the pumping arrangement 10 in the low pressure supply line 12, to ensure that there is adequate priming of the pumps 20, 24. Furthermore, additional fuel valves, for example in the form of pressure relief valves, non return valves and pump switching valves may be required to ensure correct operation of the pumping arrangement 10 over the full range of engine operating conditions. In particular, a non-return valve 25 may be required in a line 27 between the second pump 24 and the supply line 14 to ensure that the presence of the second fuel pump 24 does not negatively impact the operation of the first fuel pump 20 when the fuel pumping arrangement is operating in a mode in which the turbine 28 and second fuel pump 24 are inactive.

Whilst in the description hereinbefore reference is made to the first and second pumps 20 as taking the form of gear pumps, it will be appreciated that other forms of positive displacement pump, and indeed other forms of pump, may be used. For example, the invention could be applied to arrangements in which one or other pump, or both pumps, comprises a roto-dynamic pump such as a centrifugal pump.

FIG. 2 illustrates an alternative arrangement in which the first and second fuel pumps 20, 24 are arranged in series rather than in parallel. As the configuration shown in FIG. 2 is a series configuration, it will be appreciated that the capacity of the first fuel pump 20 must be sufficient to allow the maximum fuel delivery requirement to be met by fuel delivered from the first fuel pump 20. The first fuel pump 20 is thus larger than the corresponding fuel pump of the arrangement of FIG. 1. As with the FIG. 1 arrangement, the first fuel pump is arranged to be driven by an electrically powered motor 22 which, in turn, is controlled by associated power electronics 23. Although the first fuel pump 20 of this embodiment is larger than that of the arrangement of FIG. 1, and is able to deliver sufficient flow to meet the maximum engine fuel delivery requirement, the motor 22 associated therewith is still of a reduced size, being unable to drive the first fuel pump 20 at a sufficient rate to develop, in conjunction with the fuel metering unit 16, a system pressure level that is necessary to ensure correct operation of the engine and associated fuel system at maximum engine load conditions, such as take-off and climb.

The second fuel pump 24 of this embodiment comprises a centrifugal pump which, like the second pump 24 of the arrangement of FIG. 1, is arranged to be driven for rotation by the turbine 28 when the gas valve 32 is open. Further, and as with the arrangement of FIG. 1, the gas valve 32 could take the form of a simple on/off device or, alternatively, may be a modulating type device that provides far progressive control of the second pump 24.

In use, when the engine load condition is relatively low, such as during cruise, the gas valve 32 is closed and the turbine 28 is inactive. In this mode of operation it will be appreciated that the first fuel pump 20, under operation of the motor 22, delivers fuel to the high pressure supply line 14 at a rate and pressure sufficient to satisfy the engine fuel delivery rate and system pressure requirements. The fuel delivered by the first pump 20 flows through the second fuel pump 24, but since the turbine 28 is inactive, it is not positively pumped by the second fuel pump 24. The engine fuel delivery rate and system pressure requirements are thus met exclusively by the operation of the first fuel pump 20 and the electrically powered motor 22, under the control of the power electronics 23.

When there is an increase in engine loading that necessitates an increase in the fuel system pressure level, such as during take off or climb, or if fuel-draulic actuators need to be operated, the gas valve 32 is opened resulting in air flow along the line 30, driving the turbine 28 for rotation, and consequently in operation of the second fuel pump 24. As mentioned hereinbefore, the gas valve 32 may take the form of a modulating device that provides for progressive control of the air flow along the line 30, resulting in progressive control of the turbine 28 and the second fuel pump 24. In these circumstances, the pressure developed by the second fuel pump 24 supplements that developed by the first pump 20, the first and second fuel pumps 20, 24 operating together to achieve the required fuel delivery rate and pressure to the high pressure supply line 14, and in conjunction with the fuel metering unit 16, the required fuel delivery rate to the engine and the required system pressure level to ensure that the engine and fuel system operate correctly at the high engine load conditions.

In the embodiment of FIG. 1, 'get home' or 'limp home' functionality is provided by the inclusion of a dedicated fuel valve 21, in the form of a non-return valve, to prevent a return or back-flow of fuel through the first fuel pump 20. Similar functionality can be provided in the embodiment of FIG. 2 by providing a by-pass line 21a around the first fuel pump 20, a dedicated fuel valve 21, for example taking the form of a non-return valve of a bypass valve, being provided in the by-pass line 21a to prevent a back flow of fuel to the low pressure side of the first fuel pump 20 during normal operation.

As with the embodiment described with reference to FIG. 1, there may be circumstances in which the fuel metering unit 16 may be omitted, the fuel pumping arrangement 10 being sufficiently accurately controlled, by appropriate modulated control of the respective pump drives, as mentioned hereinbefore, so as to allow it to serve to meter or control the rate of fuel delivery to the associated engine. It is recognised that if the fuel metering unit 16 is omitted, appropriate fuel flow sensing and fuel pressure regulating devices will be required to ensure that the correct fuel delivery rate and system pressure are achieved at all operating conditions. Furthermore, a low pressure pump may be provided in the low pressure supply line 12 to permit priming of the first fuel pump 20.

As with the arrangement of FIG. 1, whilst specific forms of pump are described it will be appreciated that the invention is also applicable to arrangements where other types of pump are used.

Both of the arrangements described hereinbefore have the advantage that fuel may be delivered to the associated engine without the need to use an engine accessory gearbox to drive a fuel pump for operation. With both arrangements, space and weight savings may be made through the use of an electrically powered motor driven first fuel pump selected to meet relatively low engine load operating conditions, whilst a second fuel pump that is operated by a gas driven turbine supplements the first fuel pump during high engine load conditions, such as during take-off or climb. The arrangement of FIG. 1 has the further advantage that additional weight and space savings may be made through the use of a relatively small first fuel pump. The system weight savings that can be achieved with implementation of either of the proposed pump arrangements are significant when compared with known electric motor driven pump arrangements. Trade studies have indicated that the size and weight of the electric motor and associated power electronics required in the arrangements described herein is of the order of 25% of the size and weight of an electric motor and associated power electronics used in arrangements similar to those disclosed in the aforementioned U.S. Pat. No. 6,971,373 and US2004/0011018. It is recognised that the need for the gas turbine driven pump in the proposed arrangements has a detrimental impact upon this system weight benefit. However, calculations indicate that this pumping element of the proposed arrangements is of a similar size to the electric motor driven pumping element of the proposed arrangements, hence there is an overall system weight saving of approximately 50% when compared with the prior art motor driven pumping arrangements.

In addition to space and weight savings, the arrangements described hereinbefore have the further advantage that the thermal management issues with conventional engine gearbox driven pumps and high power electronic motor driven pumps, such as unnecessary recirculation and power electronics heat dissipation, are partially mitigated by the combination of a relatively low power electric motor driven pump with a gas turbine driven pump, that can both be modulated for optimum operating duty.

It will be appreciated that the embodiments described hereinbefore are merely examples of embodiments falling within the scope of the invention and that a wide range of modifications and alterations may be made thereto without departing from the scope of the invention. For example, the first fuel pump 20 of the series arrangement illustrated in FIG. 2 could take the form of a centrifugal pump instead of a positive displacement pump, although it is recognised that this may impact upon the complexity and weight of the overall system. Further, in both of the arrangements illustrated in FIGS. 1 and 2, the gas driven turbine 28 could be exposed to a flow of exhaust gas from the combustor stage of the associated engine, rather than bleed air from the compressor stage. The control of this exhaust gas flow to the turbine 28 would be similar to the control of the bleed air flow as described hereinbefore.

What is claimed:

1. A fuel pumping arrangement of an aircraft engine comprising:
    a first fuel pump;
    an electrically powered motor operable to drive the first fuel pump to deliver an output of a fuel to an outlet;
    a second fuel pump;
    a gas driven turbine operable to drive the second fuel pump to deliver the fuel to the outlet; and
    a controller operable to control operation of the gas driven turbine to determine the rate at which the second fuel pump is driven,
    wherein the first fuel pump and the second fuel pump are arranged in series, the second fuel pump being downstream of the first fuel pump, and
    the first fuel pump and the second fuel pump are arranged to be used in combination during high engine load conditions to meet the output of the fuel and system pressure level requirements of the aircraft engine, the output of the first fuel pump, alone, normally being used to achieve the output of the fuel and the system pressure level in lower engine load conditions.

2. The arrangement according to claim 1, wherein the controller comprises a gas valve operable to control and/or modulate supply of gas to the gas driven turbine and thereby control the operation of the gas driven turbine during all engine operating conditions.

3. The arrangement according to claim 1, wherein the second fuel pump is arranged, during periods of the high engine load conditions, to raise a pressure from which the fuel is supplied from the first fuel pump to a required system pressure level and thereby assist the first fuel pump in achieving the output of the fuel and the system pressure level.

4. The arrangement according to claim 1, wherein the second fuel pump comprises a roto-dynamic pump so as to allow delivery of the fuel from the first fuel pump in a relatively unimpeded manner when the gas driven turbine and the second fuel pump are inactive.

5. The arrangement according to claim 4, wherein the roto-dynamic pump is a centrifugal pump.

6. The arrangement according to claim 1, further comprising a by-pass passage around the first fuel pump, a dedicated fuel valve being provided in the by-pass passage.

7. The arrangement according to claim 6, wherein the dedicated fuel valve comprises one of a non-return valve and a by-pass valve.

8. The arrangement according to claim 1, further comprising power electronics to control operation of the electrically powered motor, wherein the power electronics and the controller are configured to respectively control the electrically powered motor and the gas driven turbine such that the first fuel pump and the second fuel pump are used in combination during the high engine load conditions to meet the output of the fuel and the system pressure level requirements of the aircraft engine, and the power electronics and the controller are further configured to respectively control the electrically powered motor and the gas driven turbine such that the output of the first fuel pump alone achieves the output of the fuel and the system pressure level in the lower engine load conditions.

9. The arrangement according to claim 1, further comprising a fuel metering unit which is fed by the second fuel pump and which is configured to control a rate at which the fuel is supplied to the aircraft engine.

* * * * *